United States Patent
Ware et al.

(10) Patent No.: US 10,918,952 B2
(45) Date of Patent: Feb. 16, 2021

(54) DETERMINING HARDNESS QUOTIENTS FOR LEVEL DEFINITION FILES BASED ON PLAYER SKILL LEVEL

(71) Applicant: Zynga Inc., San Francisco, CA (US)

(72) Inventors: John Carlton Ware, Millbrae, CA (US); Christopher Vance Haire, Emeryville, CA (US); William R. Watters, San Francisco, CA (US); John vanSuchtelen, San Francisco, CA (US); Michael Waite, Alamo, CA (US)

(73) Assignee: Zynga Inc., San Francisco, CA (US)

( * ) Notice: Subject to any disclaimer, the term of this patent is extended or adjusted under 35 U.S.C. 154(b) by 43 days.

(21) Appl. No.: 16/454,529

(22) Filed: Jun. 27, 2019

(65) Prior Publication Data
US 2019/0314725 A1    Oct. 17, 2019

Related U.S. Application Data

(63) Continuation of application No. 14/569,534, filed on Dec. 12, 2014, now Pat. No. 10,384,132.
(Continued)

(51) Int. Cl.
*A63F 13/67* (2014.01)
*A63F 13/30* (2014.01)
(Continued)

(52) U.S. Cl.
CPC ............. *A63F 13/67* (2014.09); *A63F 3/0423* (2013.01); *A63F 13/30* (2014.09); *A63F 13/32* (2014.09);
(Continued)

(58) Field of Classification Search
CPC ........ A63F 13/67; A63F 13/30; A63F 13/537; A63F 13/798; A63F 13/35; A63F 13/92;
(Continued)

(56) References Cited

U.S. PATENT DOCUMENTS 4,015,846 A * 4/1977 Runte ..................... A63F 13/10
                                                         463/3
4,679,789 A * 7/1987 Okada ..................... A63F 13/10
                                                         463/23
(Continued)

FOREIGN PATENT DOCUMENTS

WO    WO-2005061067 A1    7/2005

OTHER PUBLICATIONS

"U.S. Appl. No. 14/849,291, Notice of Allowance dated Oct. 9, 2019", 14 pgs.
(Continued)

*Primary Examiner* — Omkar A Deodhar
*Assistant Examiner* — Matthew D Hoel
(74) *Attorney, Agent, or Firm* — Schwegman Lundberg & Woessner, P.A.

(57) ABSTRACT

A system, a machine-readable storage medium storing instructions, and a computer-implemented method are described herein for a System Tuner for customizing a player's experience. A System Tuner selects a hardness quotient, based on a player skill level, from a hardness quotient range, the player skill level for a player is calculated by a client computing device based at least on a plurality of game moves in a first game level completed by the player. The System Tuner provides the hardness quotient to a level definition file for a second game level. The level definition file modifies at least one feature of the second game level according to the hardness quotient. The System Tuner modifies the hardness quotient range based at least on a performance of the plurality of player's in the second game level and the respective hardness quotients assigned to each of those players for their game play in the second game level.

20 Claims, 7 Drawing Sheets

Related U.S. Application Data

(60) Provisional application No. 62/048,362, filed on Sep. 10, 2014.

(51) Int. Cl.

| | | |
|---|---|---|
| A63F 13/32 | (2014.01) | |
| A63F 13/327 | (2014.01) | |
| A63F 13/33 | (2014.01) | |
| A63F 13/332 | (2014.01) | |
| A63F 13/335 | (2014.01) | |
| A63F 13/35 | (2014.01) | |
| A63F 13/537 | (2014.01) | |
| A63F 13/79 | (2014.01) | |
| A63F 13/798 | (2014.01) | |
| A63F 13/87 | (2014.01) | |
| A63F 13/92 | (2014.01) | |
| A63F 3/04 | (2006.01) | |
| A63F 13/837 | (2014.01) | |
| A63F 13/822 | (2014.01) | |

(52) U.S. Cl.
CPC ........... *A63F 13/327* (2014.09); *A63F 13/33* (2014.09); *A63F 13/332* (2014.09); *A63F 13/335* (2014.09); *A63F 13/35* (2014.09); *A63F 13/537* (2014.09); *A63F 13/79* (2014.09); *A63F 13/798* (2014.09); *A63F 13/87* (2014.09); *A63F 13/92* (2014.09); *A63F 13/822* (2014.09); *A63F 13/837* (2014.09)

(58) Field of Classification Search
CPC ...... A63F 13/927; A63F 13/33; A63F 13/332; A63F 13/335; A63F 13/87
See application file for complete search history.

(56) References Cited

U.S. PATENT DOCUMENTS

| | | | | |
|---|---|---|---|---|
| 5,370,399 A * | 12/1994 | Liverance | ........... | G07F 17/3244 |
| | | | | 434/323 |
| 5,377,100 A * | 12/1994 | Pope | .................. | A61B 5/0476 |
| | | | | 600/545 |
| 5,683,082 A * | 11/1997 | Takemoto | ................. | G07F 9/02 |
| | | | | 273/121 B |
| 5,813,913 A * | 9/1998 | Berner | ................... | A63F 13/10 |
| | | | | 463/40 |
| 5,968,063 A | 10/1999 | Chu et al. | | |
| 5,970,479 A | 10/1999 | Shepherd | | |
| 5,971,850 A * | 10/1999 | Liverance | ........... | G07F 17/3244 |
| | | | | 273/143 R |
| 6,106,395 A * | 8/2000 | Begis | ...................... | A63F 13/12 |
| | | | | 463/23 |
| 6,174,237 B1 * | 1/2001 | Stephenson | ............ | A63F 13/12 |
| | | | | 463/42 |
| 6,190,370 B1 | 2/2001 | Tsui | | |
| 6,213,873 B1 * | 4/2001 | Gasper | ................ | A63F 3/00643 |
| | | | | 345/473 |
| 6,302,793 B1 * | 10/2001 | Fertitta, III | ............ | G07F 17/32 |
| | | | | 463/25 |
| 6,358,148 B1 * | 3/2002 | Tanaka | ................... | A63F 13/10 |
| | | | | 463/23 |
| 6,375,570 B1 | 4/2002 | Poole | | |
| 6,579,177 B2 | 6/2003 | Mraovic | | |
| 6,641,482 B2 | 11/2003 | Masuyama et al. | | |
| 6,648,760 B1 * | 11/2003 | Nicastro | ................ | G09B 9/052 |
| | | | | 434/353 |
| 6,702,675 B2 | 3/2004 | Poole et al. | | |
| 6,758,752 B1 | 7/2004 | Miyagawa | | |
| 7,076,445 B1 | 7/2006 | Cartwright | | |
| 7,094,147 B2 | 8/2006 | Nakata et al. | | |
| 7,192,345 B2 | 3/2007 | Muir et al. | | |
| 7,367,882 B2 * | 5/2008 | Fukutome | ............... | A63F 13/10 |
| | | | | 463/7 |
| 7,425,175 B2 | 9/2008 | Nakano et al. | | |
| 7,717,781 B2 | 5/2010 | Hattori et al. | | |
| 7,775,866 B2 | 8/2010 | Mizuguchi et al. | | |
| 7,818,399 B1 | 10/2010 | Ross, Jr. et al. | | |
| 7,983,895 B2 | 7/2011 | Mcentee et al. | | |
| 8,016,653 B2 | 9/2011 | Pendleton et al. | | |
| 8,096,879 B2 | 1/2012 | Takeda | | |
| 8,161,008 B2 | 4/2012 | Zhang et al. | | |
| 8,210,925 B2 * | 7/2012 | Johnson | .................. | A63F 13/67 |
| | | | | 463/23 |
| 8,219,509 B2 * | 7/2012 | Ansari | ............. | H04N 21/44222 |
| | | | | 706/12 |
| 8,303,416 B1 | 11/2012 | Thakkar et al. | | |
| 8,313,370 B2 | 11/2012 | Rogers et al. | | |
| 8,366,527 B2 | 2/2013 | Takeda | | |
| 8,401,710 B2 | 3/2013 | Budhraja et al. | | |
| 8,439,759 B1 * | 5/2013 | Mello | ..................... | A63F 13/85 |
| | | | | 463/42 |
| 8,475,274 B2 * | 7/2013 | Jacob | ...................... | A63F 13/67 |
| | | | | 463/37 |
| 8,496,531 B2 * | 7/2013 | Youm | ..................... | A63F 13/77 |
| | | | | 463/42 |
| 8,523,660 B2 | 9/2013 | Jacob | | |
| 8,529,355 B2 | 9/2013 | Hiratake et al. | | |
| 8,535,149 B2 | 9/2013 | Ziegler et al. | | |
| 8,550,920 B1 | 10/2013 | Allen et al. | | |
| 8,585,505 B2 | 11/2013 | Youm | | |
| 8,622,828 B1 * | 1/2014 | Harrington | ............. | A63F 13/46 |
| | | | | 463/31 |
| 8,632,072 B2 | 1/2014 | Loveland | | |
| 8,663,004 B1 * | 3/2014 | Xu | ........................ | A63F 13/798 |
| | | | | 463/29 |
| 8,668,581 B2 | 3/2014 | Arnone et al. | | |
| 8,701,103 B1 | 4/2014 | Hsu et al. | | |
| 8,721,413 B2 | 5/2014 | Mohammed et al. | | |
| 8,734,243 B2 * | 5/2014 | Harrington | ............. | A63F 13/85 |
| | | | | 463/29 |
| 8,764,561 B1 * | 7/2014 | Lan | ....................... | A63F 13/795 |
| | | | | 463/31 |
| 8,944,908 B1 * | 2/2015 | Wakeford | ............... | A63F 13/58 |
| | | | | 463/23 |
| 9,033,804 B2 | 5/2015 | Takagi et al. | | |
| 9,039,535 B2 * | 5/2015 | Boss | ........................ | A63F 9/24 |
| | | | | 463/42 |
| 9,101,834 B2 * | 8/2015 | LeTourneau | ............. | A63F 13/12 |
| 9,104,834 B2 * | 8/2015 | Bickford | ................. | G06F 30/398 |
| 9,132,353 B2 | 9/2015 | Otomo | | |
| 9,138,641 B2 | 9/2015 | Rogers et al. | | |
| 9,153,075 B2 | 10/2015 | Ueno et al. | | |
| 9,186,584 B2 * | 11/2015 | Morrison | ............... | A63F 13/798 |
| 9,205,338 B1 * | 12/2015 | Wakeford | ............... | A63F 13/77 |
| 9,218,717 B2 | 12/2015 | Indrakumar | | |
| 9,266,026 B2 * | 2/2016 | Jacob | ...................... | A63F 13/67 |
| 9,272,208 B1 * | 3/2016 | LeTourneau | ............. | A63F 13/69 |
| 9,415,305 B2 * | 8/2016 | Cudak | ..................... | A63F 13/12 |
| 9,533,226 B2 * | 1/2017 | Wakeford | ............... | A63F 13/35 |
| 9,566,518 B2 | 2/2017 | Branson et al. | | |
| 9,573,063 B2 | 2/2017 | Branson et al. | | |
| 9,604,145 B2 * | 3/2017 | Morrison | ................. | A63F 13/12 |
| 9,649,568 B2 * | 5/2017 | Wada | ..................... | A63F 13/35 |
| 9,675,889 B2 * | 6/2017 | Lai | .......................... | A63F 13/92 |
| 9,724,606 B2 | 8/2017 | Lai et al. | | |
| 9,737,815 B2 | 8/2017 | Dhawan et al. | | |
| 9,757,650 B2 | 9/2017 | Mehra et al. | | |
| 10,112,112 B2 | 10/2018 | Lai et al. | | |
| 10,279,264 B1 | 5/2019 | Aghdaie et al. | | |
| 10,315,114 B2 | 6/2019 | Dhawan et al. | | |
| 10,363,487 B2 | 7/2019 | Lai et al. | | |
| 10,384,132 B2 | 8/2019 | Ware et al. | | |
| 10,456,686 B2 | 10/2019 | Patton et al. | | |
| 10,556,182 B2 | 2/2020 | Ntoulas et al. | | |
| 10,561,944 B2 | 2/2020 | Ware et al. | | |
| 2002/0016954 A1 | 2/2002 | Charisius et al. | | |
| 2002/0072418 A1 | 6/2002 | Masuyama et al. | | |
| 2003/0040350 A1 | 2/2003 | Nakata et al. | | |
| 2003/0083009 A1 | 5/2003 | Freyman et al. | | |
| 2003/0100369 A1 | 5/2003 | Gatto et al. | | |
| 2003/0114219 A1 | 6/2003 | McClintic | | |

(56) References Cited

U.S. PATENT DOCUMENTS

| | | |
|---|---|---|
| 2003/0153373 A1 | 8/2003 | Squibbs |
| 2003/0220796 A1 | 11/2003 | Aoyama et al. |
| 2003/0224858 A1 | 12/2003 | Yoseloff et al. |
| 2004/0018878 A1 | 1/2004 | Silverman et al. |
| 2004/0019391 A1 | 1/2004 | Ferraz et al. |
| 2004/0053665 A1 | 3/2004 | Baerlocher |
| 2004/0106452 A1 | 6/2004 | Nguyen et al. |
| 2004/0121838 A1 | 6/2004 | Hughs-Baird et al. |
| 2004/0152505 A1 | 8/2004 | Herrmann et al. |
| 2005/0043075 A1 | 2/2005 | Lin et al. |
| 2005/0202861 A1 | 9/2005 | Dougherty et al. |
| 2005/0266908 A1 | 12/2005 | Hattori et al. |
| 2005/0277456 A1 | 12/2005 | Mizuguchi et al. |
| 2005/0289523 A1 | 12/2005 | Spektor et al. |
| 2006/0003841 A1 | 1/2006 | Kobayashi et al. |
| 2006/0121991 A1 | 6/2006 | Borinik et al. |
| 2006/0181535 A1* | 8/2006 | Watt .................. G06T 13/40 345/473 |
| 2006/0258415 A1 | 11/2006 | Nakano et al. |
| 2006/0281535 A1 | 12/2006 | Bogan |
| 2006/0287046 A1* | 12/2006 | Walker ................ G07F 17/32 463/16 |
| 2007/0026934 A1* | 2/2007 | Herbrich ........... A63F 11/0051 463/23 |
| 2007/0054717 A1 | 3/2007 | Youm et al. |
| 2007/0060038 A1 | 3/2007 | Yamashita et al. |
| 2007/0060338 A1* | 3/2007 | Kefaloukos .......... A63F 13/426 463/30 |
| 2007/0066403 A1 | 3/2007 | Conkwright |
| 2007/0156727 A1 | 7/2007 | Lim |
| 2007/0226678 A1 | 9/2007 | Li et al. |
| 2007/0265718 A1 | 11/2007 | Graepel et al. |
| 2008/0127163 A1 | 5/2008 | Fong et al. |
| 2008/0161079 A1 | 7/2008 | Wei |
| 2008/0182635 A1 | 7/2008 | Chiu |
| 2008/0227525 A1* | 9/2008 | Kelly ................. G07F 17/3276 463/20 |
| 2008/0266250 A1* | 10/2008 | Jacob ................. G06F 3/04815 345/156 |
| 2008/0268943 A1 | 10/2008 | Jacob |
| 2009/0131152 A1 | 5/2009 | Busse |
| 2009/0149246 A1* | 6/2009 | Opaluch ............. A63F 13/10 463/29 |
| 2009/0209323 A1* | 8/2009 | Ansari ................. A63F 13/67 463/23 |
| 2009/0215526 A1* | 8/2009 | Matsumoto ........... A63F 13/52 463/23 |
| 2009/0253517 A1 | 10/2009 | Bererton et al. |
| 2010/0144424 A1 | 6/2010 | Rogers et al. |
| 2010/0144444 A1 | 6/2010 | Graham |
| 2010/0279762 A1* | 11/2010 | Sohn ................. A63F 13/58 463/23 |
| 2010/0304839 A1* | 12/2010 | Johnson .............. A63F 13/35 463/23 |
| 2011/0086702 A1 | 4/2011 | Borst et al. |
| 2011/0165939 A1 | 7/2011 | Borst et al. |
| 2011/0281639 A1 | 11/2011 | Porat et al. |
| 2011/0312398 A1 | 12/2011 | Ziegler et al. |
| 2011/0319148 A1 | 12/2011 | Kinnebrew et al. |
| 2012/0010734 A1* | 1/2012 | Youm .................. A63F 13/335 700/92 |
| 2012/0013072 A1 | 1/2012 | Loveland |
| 2012/0047156 A1 | 2/2012 | Jarvinen et al. |
| 2012/0088562 A1 | 4/2012 | Mohammed et al. |
| 2013/0072287 A1 | 3/2013 | Okuaki et al. |
| 2013/0083003 A1 | 4/2013 | Perez et al. |
| 2013/0130807 A1 | 5/2013 | Youm et al. |
| 2013/0151603 A1 | 6/2013 | Lobb et al. |
| 2013/0154958 A1 | 6/2013 | Clavin et al. |
| 2013/0172061 A1 | 7/2013 | Iosilevsky et al. |
| 2013/0184080 A1 | 7/2013 | Kniberg et al. |
| 2013/0205276 A1 | 8/2013 | Hirsch et al. |
| 2013/0225260 A1* | 8/2013 | Cudak ................. A63F 13/67 463/23 |
| 2013/0311951 A1* | 11/2013 | Jacob ................. G06F 3/04815 715/848 |
| 2013/0324253 A1 | 12/2013 | Hiratake et al. |
| 2014/0057722 A1 | 2/2014 | Justice et al. |
| 2014/0066176 A1* | 3/2014 | LeTourneau ........... A63F 13/12 463/23 |
| 2014/0108939 A1 | 4/2014 | Mahapatra et al. |
| 2014/0274258 A1 | 9/2014 | Hartmann et al. |
| 2014/0274304 A1 | 9/2014 | Haswell |
| 2014/0295925 A1* | 10/2014 | Gladwell ............. A63F 13/67 463/9 |
| 2015/0209672 A1 | 7/2015 | Otomo |
| 2015/0246286 A1 | 9/2015 | Branson et al. |
| 2015/0352436 A1 | 12/2015 | Pieron et al. |
| 2015/0375120 A1 | 12/2015 | Lim et al. |
| 2016/0067601 A1 | 3/2016 | Mehra et al. |
| 2016/0067605 A1 | 3/2016 | Lai et al. |
| 2016/0067610 A1 | 3/2016 | Ware et al. |
| 2016/0067611 A1* | 3/2016 | Ware .................. A63F 13/79 463/29 |
| 2016/0067612 A1 | 3/2016 | Ntoulas et al. |
| 2016/0067613 A1 | 3/2016 | Ntoulas et al. |
| 2016/0067615 A1 | 3/2016 | Lai et al. |
| 2016/0082354 A1* | 3/2016 | Wakeford ............ A63F 13/77 463/29 |
| 2016/0098161 A1 | 4/2016 | Baack et al. |
| 2016/0110962 A1 | 4/2016 | Arnone et al. |
| 2016/0117890 A1 | 4/2016 | Arnone et al. |
| 2016/0256775 A1 | 9/2016 | Gustafson et al. |
| 2016/0274887 A1 | 9/2016 | Sternfeld et al. |
| 2016/0381109 A1 | 12/2016 | Barnett et al. |
| 2016/0381110 A1 | 12/2016 | Barnett et al. |
| 2017/0246538 A1 | 8/2017 | Lai et al. |
| 2017/0246540 A1 | 8/2017 | Lai et al. |
| 2017/0259178 A1 | 9/2017 | Aghdaie et al. |
| 2017/0304722 A1 | 10/2017 | Mehra et al. |
| 2017/0312636 A1 | 11/2017 | Dhawan et al. |
| 2019/0224573 A1 | 7/2019 | Dhawan et al. |
| 2019/0308105 A1 | 10/2019 | Lai et al. |
| 2020/0001184 A1 | 1/2020 | Patton et al. |
| 2020/0222810 A1 | 7/2020 | Ntoulas et al. |
| 2020/0222811 A1 | 7/2020 | Ware et al. |

OTHER PUBLICATIONS

"U.S. Appl. No. 14/849,291, Response filed Sep. 23, 2019 to Non-Final Office Action dated Mar. 22, 2019", 12 pgs.

"U.S. Appl. No. 14/849,341, Corrected Notice of Allowability dated Jan. 14, 2020", 2 pgs.

"U.S. Appl. No. 14/849,341, Notice of Allowance dated Oct. 2, 2019", 9 pgs.

"U.S. Appl. No. 14/849,341, Response filed Sep. 19, 2019 to Final Office Action dated Apr. 19, 2019", 10 pgs.

"U.S. Appl. No. 16/371,967, Non Final Office Action dated Apr. 9, 2020", 10 pgs.

"U.S. Appl. No. 16/427,925, Non Final Office Action dated Jun. 8, 2020", 9 pgs.

U.S. Appl. No. 14/546,865, filed Nov. 18, 2014, Systems and Methods for Determining Game Level Attributes Based on Player Skill Level Prior to Game Play in the Level, now U.S. Pat. No. 9,675,889.

U.S. Appl. No. 15/593,807, filed May 12, 2017, Systems and Methods for Determining Game Level Attributes Based on Player Skill Level Prior to Game Play in the Level.

U.S. Appl. No. 16/427,925, filed May 31, 2019, Systems and Methods for Determining Game Level Attributes Based on Player Skill Level Prior to Game Play in the Level.

U.S. Appl. No. 14/569,534, filed Dec. 12, 2014, Determining Hardness Quotients for Level Definition Files Based on Player Skill Level.

U.S. Appl. No. 14/601,807, filed Jan. 21, 2015, Experimentation and Optimization Service, now U.S. Pat. No. 9,737,815.

U.S. Appl. No. 15/652,800, filed Jul. 18, 2017, Experimentation and Optimization Service, now U.S. Pat. No. 10,315,114.

(56) References Cited

OTHER PUBLICATIONS

U.S. Appl. No. 16/371,967, filed Apr. 1, 2019, Experimentation and Optimization Service.
U.S. Appl. No. 14/849,291, filed Sep. 9, 2015, Adjusting Object Adaptive Modification or Game Level Difficulty and Physical Gestures Through Level Definition Files.
U.S. Appl. No. 14/849,341, filed Sep. 9, 2015, Automated Game Modification Based on Playing Style.
U.S. Appl. No. 14/572,203, filed Dec. 16, 2014, Sequencing and Locations of Selected Virtual Objects to Trigger Targeted Game Actions, now U.S. Pat. No. 9,757,650.
U.S. Appl. No. 15/646,953, filed Jul. 11, 2017, Sequencing and Locations of Selected Virtual Objects to Trigger Targeted Game Actions.
U.S. Appl. No. 14/849,354, filed Sep. 9, 2015, Methods and Systems for Adaptive Tuning of Game Events.
"U.S. Appl. No. 13/604,552, Examiner Interview Summary dated Oct. 16, 2015", 3 pgs.
"U.S. Appl. No. 13/604,552, Final Office Action dated Apr. 8, 2015", 8 pgs.
"U.S. Appl. No. 13/604,552, Non Final Office Action dated Jul. 27, 2015", 8 pgs.
"U.S. Appl. No. 13/604,552, Non Final Office Action dated Oct. 31, 2014", 8 pgs.
"U.S. Appl. No. 13/604,552, Notice of Allowance dated Nov. 20, 2015", 5 pgs.
"U.S. Appl. No. 13/604,552, Response filed Jan. 30, 2015 to Non-Final Office Action dated Oct. 31, 2014", 10 pgs.
"U.S. Appl. No. 13/604,552, Response filed Jul. 1, 2015 to Final Office Action dated Apr. 8, 2015", 10 pgs.
"U.S. Appl. No. 13/604,552, Response filed Oct. 14, 2015 to Final Office Action dated Jul. 27, 2015", 11 pgs.
"U.S. Appl. No. 14/018,998, Non Final Office Action dated Oct. 31, 2014", 8 pgs.
"U.S. Appl. No. 14/018,998, Notice of Allowance dated Apr. 8, 2015", 8 pgs.
"U.S. Appl. No. 14/018,998, Response filed Jan. 30, 2015 to Non-Final Office Action dated Oct. 31, 2014", 10 pgs.
"U.S. Appl. No. 14/480,983, Examiner Interview Summary dated Jan. 23, 2017", 3 pgs.
"U.S. Appl. No. 14/480,983, First Action Interview—Pre-Interview Communication dated Oct. 31, 2016", 5 pgs.
"U.S. Appl. No. 14/480,983, Notice of Allowance dated Mar. 29, 2017", 9 pgs.
"U.S. Appl. No. 14/480,983, Response filed Jan. 18, 2017 to First Action Interview—Pre-Interview Communication dated Oct. 31, 2016", 11 pgs.
"U.S. Appl. No. 14/546,865, Amendment Under 37 C.F.R. 1.312 filed Mar. 1, 2017", 9 pgs.
"U.S. Appl. No. 14/546,865, Corrected Notice of Allowance dated Mar. 3, 2017", 4 pgs.
"U.S. Appl. No. 14/546,865, Examiner Interview Summary dated Dec. 21, 2016", 3 pgs.
"U.S. Appl. No. 14/546,865, Non Final Office Action dated Sep. 15, 2016", 8 pgs.
"U.S. Appl. No. 14/546,865, Notice of Allowance dated Feb. 7, 2017", 5 pgs.
"U.S. Appl. No. 14/546,865, PTO Response to Rule 312 Communication dated Mar. 10, 2017", 2 pgs.
"U.S. Appl. No. 14/546,865, Response filed Dec. 14, 2016 to Non Final Office Action dated Sep. 15, 2016", 12 pgs.
"U.S. Appl. No. 14/569,534, Amendment under 37 C.F.R. § 1.312 filed Jun. 26, 2019," 3 pgs.
"U.S. Appl. No. 14/569,534, Examiner Interview Summary dated Dec. 13, 2018", 3 pgs.
"U.S. Appl. No. 14/569,534, Final Office Action dated Apr. 20, 2018", 9 pgs.
"U.S. Appl. No. 14/569,534, Non Final Office Action dated Jun. 23, 2017", 9 pgs.

"U.S. Appl. No. 14/569,534, Non Final Office Action dated Aug. 28, 2018", 23 pgs.
"U.S. Appl. No. 14/569,534, Notice of Allowance dated Mar. 27, 2019", 14 pgs.
"U.S. Appl. No. 14/569,534, Response filed Jul. 20, 2018 to Final Office Action dated Apr. 20, 2018", 13 pgs.
"U.S. Appl. No. 14/569,534, Response filed Nov. 28, 2018 to Non Final Office Action dated Nov. 28, 2018", 16 pgs.
"U.S. Appl. No. 14/569,534, Response filed Dec. 22, 2017 to Non Final Office Action dated Jun. 23, 2017", 14 pgs.
"U.S. Appl. No. 14/572,203, Examiner Interview Summary dated Mar. 10, 2017", 4 pgs.
"U.S. Appl. No. 14/572,203, Examiner Interview Summary dated Apr. 7, 2016", 19 pgs.
"U.S. Appl. No. 14/572,203, Examiner Interview Summary dated Jun. 29, 2016", 3 pgs.
"U.S. Appl. No. 14/572,203, Final Office Action dated Sep. 13, 2016", 13 pgs.
"U.S. Appl. No. 14/572,203, First Action Interview dated Feb. 26, 2016", 15 pgs.
"U.S. Appl. No. 14/572,203, First Action Interview dated Apr. 7, 2016", 20 pgs.
"U.S. Appl. No. 14/572,203, Non Final Office Action dated Dec. 30, 2016", 12 pgs.
"U.S. Appl. No. 14/572,203, Notice of Allowance dated Apr. 21, 2017", 12 pgs.
"U.S. Appl. No. 14/572,203, Response filed Mar. 3, 2017 to Non Final Office Action dated Dec. 30, 2016", 10 pgs.
"U.S. Appl. No. 14/572,203, Response filed Dec. 5, 2016 to Final Office Action dated Sep. 13, 2016", 11 pgs.
"U.S. Appl. No. 14/572,203, Response filed Jun. 7, 2016 to First Action Interview dated Apr. 7, 2016", 16 pgs.
"U.S. Appl. No. 14/601,807, First Action Interview—Office Action Summary dated Mar. 6, 2017", 3 pgs.
"U.S. Appl. No. 14/601,807, First Action Interview—Pre-Interview Communication dated Nov. 1, 2016", 4 pgs.
"U.S. Appl. No. 14/601,807, Notice of Allowance dated Jun. 7, 2017", 5 pgs.
"U.S. Appl. No. 14/601,807, Response filed Apr. 14, 2017 to Non Final Office Action dated Mar. 6, 2017", 9 pgs.
"U.S. Appl. No. 14/601,807, Response filed Dec. 15, 2016 to First Action Interview—Pre-Interview Communication dated Nov. 1, 2016", 9 pgs.
"U.S. Appl. No. 14/662,704, First Action Interview—Pre-Interview Communication dated Aug. 25, 2016", 5 pgs.
"U.S. Appl. No. 14/662,704, Non Final Office Action dated Jan. 27, 2017", 15 pgs.
"U.S. Appl. No. 14/849,291, Examiner Interview Summary dated Nov. 20, 2017", 3 pgs.
"U.S. Appl. No. 14/849,291, Final Office Action dated Oct. 6, 2017", 12 pgs.
"U.S. Appl. No. 14/849,291, Final Office Action dated Oct. 22, 2018", 15 pgs.
"U.S. Appl. No. 14/849,291, Non Final Office Action dated Feb. 12, 2016", 9 pgs.
"U.S. Appl. No. 14/849,291, Non Final Office Action dated Mar. 22, 2019", 15 pgs.
"U.S. Appl. No. 14/849,291, Non Final Office Action dated Apr. 20, 2018", 14 pgs.
"U.S. Appl. No. 14/849,291, Non Final Office Action dated Dec. 30, 2016", 9 pgs.
"U.S. Appl. No. 14/849,291, Response filed Jan. 22, 2019 to Final Office Action dated Oct. 22, 2018", 12 pgs.
"U.S. Appl. No. 14/849,291, Response filed Mar. 6, 2018 to Final Office Action dated Oct. 6, 2017", 11 pgs.
"U.S. Appl. No. 14/849,291, Response filed May 10, 2016 to Non Final Office Action dated Feb. 12, 2016", 14 pgs.
"U.S. Appl. No. 14/849,291, Response filed Sep. 20, 2018 to Non Final Office Actio dated Apr. 20, 2018", 11 pgs.
"U.S. Appl. No. 14/849,291, Response filed May 30, 2017 to Non Final Office Action dated Dec. 30, 2016", 11 pgs.
"U.S. Appl. No. 14/849,341, Final Office Action dated Mar. 7, 2018", 15 pgs.

(56) References Cited

OTHER PUBLICATIONS

"U.S. Appl. No. 14/849,341, Final Office Action dated Apr. 19, 2019", 12 pgs.
"U.S. Appl. No. 14/849,341, Non Final Office Action dated Jul. 6, 2017", 14 pgs.
"U.S. Appl. No. 14/849,341, Non Final Office Action dated Sep. 11, 2018", 12 pgs.
"U.S. Appl. No. 14/849,341, Response filed Dec. 6, 2017 to Non Final Office Action dated Jul. 6, 2017", 11 pgs.
"U.S. Appl. No. 14/849,341, Response Filed Aug. 7, 2018 to Final Office Action dated Mar. 7, 2018", 12 pgs.
"U.S. Appl. No. 14/849,354 Notice of Non-Compliant Amendment dated Apr. 25, 2018", 3 pgs.
"U.S. Appl. No. 14/849,354 Response Filed Jun. 25, 2018 to Notice of Non-Compliant Amendment dated Apr. 25, 2018", 8 pgs.
"U.S. Appl. No. 14/849,354, Final Office Action dated Apr. 29, 2019", 10 pgs.
"U.S. Appl. No. 14/849,354, Non Final Office Action dated Sep. 21, 2018", 10 pgs.
"U.S. Appl. No. 14/849,354, Notice of Allowance dated Jun. 12, 2019", 7 pgs.
"U.S. Appl. No. 14/849,354, Response filed Feb. 20, 2018 to Restriction Requirement dated Oct. 19, 2017", 8 pgs.
"U.S. Appl. No. 14/849,354, Response filed Feb. 21, 2019 to Non Final Office Action dated Sep. 21, 2018", 11 pgs.
"U.S. Appl. No. 14/849,354, Response filed May 14, 2019 to Final Office Action dated Apr. 29, 2019", 12 pgs.
"U.S. Appl. No. 14/849,354, Restriction Requirement dated Oct. 19, 2017", 6 pgs.
"U.S. Appl. No. 14/876,208, Examiner Interview Summary dated Aug. 16, 2018", 3 pgs.
"U.S. Appl. No. 14/876,208, Final Office Action dated Jun. 29, 2017", 7 pgs.
"U.S. Appl. No. 14/876,208, Final Office Action dated Jun. 29, 2018", 13 pgs.
"U.S. Appl. No. 14/876,208, Non Final Office Action dated Feb. 27, 2017", 7 pgs.
"U.S. Appl. No. 14/876,208, Non Final Office Action dated Nov. 29, 2018", 20 pgs.
"U.S. Appl. No. 14/876,208, Non Final Office Action dated Dec. 20, 2017", 9 pgs.
"U.S. Appl. No. 14/876,208, Notice of Allowance dated Apr. 11, 2019", 13 pgs.
"U.S. Appl. No. 14/876,208, Response filed Feb. 27, 2019 to Non Final Office Action dated Nov. 29, 2018", 12 pgs.
"U.S. Appl. No. 14/876,208, Response filed May 26, 2017 to Non Final Office Action dated Feb. 27, 2017", 9 pgs.
"U.S. Appl. No. 14/876,208, Response filed Oct. 29, 2018 to Final Office Action dated Jun. 29, 2018", 11 pgs.
"U.S. Appl. No. 14/876,208, Response filed Oct. 30, 2017 to Final Office Action dated Jun. 29, 2017", 12 pgs.
"U.S. Appl. No. 15/593,807, Examiner Interview Summary dated Jul. 3, 2018", 2 pgs.
"U.S. Appl. No. 15/593,807, Final Office Action dated Dec. 11, 2018", 6 pgs.
"U.S. Appl. No. 15/593,807, First Action Interview—Office Action Summary dated Jul. 10, 2018", 3 pgs.
"U.S. Appl. No. 15/593,807, First Action Interview—Pre-Interview Communication dated Mar. 16, 2018", 4 pgs.
"U.S. Appl. No. 15/593,807, Notice of Allowance dated Feb. 26, 2019", 5 pgs.
"U.S. Appl. No. 15/593,807, Response filed Feb. 8, 2019 to Final Office Action dated Dec. 11, 2018", 11 pgs.
"U.S. Appl. No. 15/593,807, Response filed Sep. 10, 2018 to First Action Interview dated Jul. 10, 2018", 11 pgs.
"U.S. Appl. No. 15/594,016, First Action Interview—Pre-Interview Communication dated Aug. 8, 2017", 4 pgs.
"U.S. Appl. No. 15/594,016, Non Final Office Action dated Feb. 6, 2018", 6 pgs.
"U.S. Appl. No. 15/594,016, Notice of Allowance dated Jun. 15, 2018", 8 pgs.
"U.S. Appl. No. 15/594,016, Preliminary Amendment filed May 15, 2017", 9 pgs.
"U.S. Appl. No. 15/594,016, Response filed Mar. 6, 2018 to Non Final Office Action dated Feb. 6, 2018", 11 pgs.
"U.S. Appl. No. 15/646,953, Final Office Action dated Nov. 19, 2018", 22 pgs.
"U.S. Appl. No. 15/646,953, Non Final Office Action dated Jan. 26, 2018", 13 pgs.
"U.S. Appl. No. 15/646,953, Preliminary Amendment filed Jul. 12, 2017", 8 pgs.
"U.S. Appl. No. 15/646,953, Response filed Jun. 26, 2018 to Non Final Office Action dated Jan. 26, 2018", 14 pgs.
"U.S. Appl. No. 15/652,800, Corrected Notice of Allowability dated Mar. 28, 2019", 2 pgs.
"U.S. Appl. No. 15/652,800, Corrected Notice of Allowability dated May 13, 2019", 3 pgs.
"U.S. Appl. No. 15/652,800, Examiner Interview Summary dated Jul. 3, 2018", 2 pgs.
"U.S. Appl. No. 15/652,800, First Action Interview—Office Action Summary dated Jul. 13, 2018", 3 pgs.
"U.S. Appl. No. 15/652,800, First Action Interview—Pre-Interview Communication dated Apr. 10, 2018", 4 pgs.
"U.S. Appl. No. 15/652,800, Notice of Allowance dated Dec. 28, 2018", 6 pgs.
"U.S. Appl. No. 15/652,800, Response filed Nov. 13, 2018 to First Action Interview—Office Action Summary dated Jul. 13, 2018", 14 pgs.
"U.S. Appl. No. 15/593,807, Preliminary Amendment filed May 15, 2017", 8 pgs.
Walt, Scacchi, et al., "Free and Open Source Development Practices in the Game Community", IEEE 2004, [Online] retrieved from the internet:<http://ieeexplore.ieee.org/stamp/stamp.jsp?tp=&arnumber=1259221>, 59-66.
"U.S. Appl. No. 16/738,474, Preliminary Amendment filed Jul. 6, 2020", 8 pages.
"U.S. Appl. No. 16/742,609, Preliminary Amendment filed Jul. 6, 2020", 8 pages.
"U.S. Appl. No. 16/371,967, Response filed Jul. 9, 2020 to Non Final Office Action dated Apr. 9, 2020", 16 pages.
"U.S. Appl. No. 16/371,967, Ex Parte Quayle Action dated Jul. 29, 2020", 4 pages.
"U.S. Appl. No. 16/371,967, Response filed Sep. 29, 2020 to Ex Parte Quayle Action dated Jul. 29, 2020", 13 pages.
"U.S. Appl. No. 16/742,609, Non Final Office Action dated Oct. 7, 2020", 9 pages.

\* cited by examiner

DETERMINING HARDNESS QUOTIENTS FOR LEVEL DEFINITION FILES BASED ON PLAYER SKILL LEVEL

CROSS-REFERENCE TO RELATED APPLICATIONS

This application is a continuation of U.S. patent application Ser. No. 14/569,534, filed on Dec. 12, 2014, which claims the benefit of priority to U.S. Provisional Application Ser. No. 62/048,362, filed on Sep. 10, 2014, which applications are hereby incorporated herein by reference in their entireties.

TECHNICAL FIELD

The present disclosure generally relates to games and applications in general and, in particular embodiments, to customizing user experiences.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social networking system. Such an online social networking system allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

DETAILED DESCRIPTION

Figure 1:
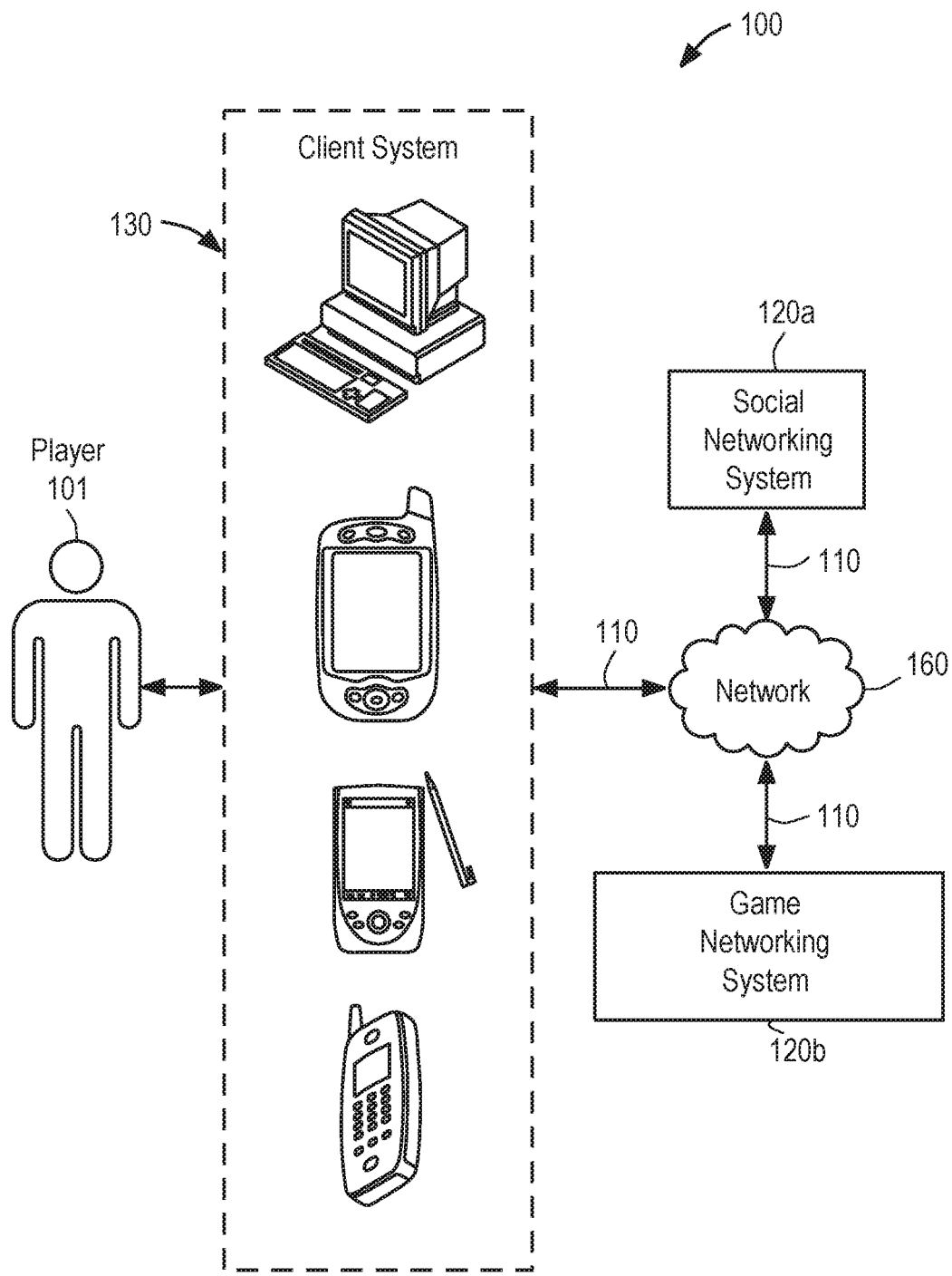
FIG. 1 is a schematic diagram showing an example of a system, according to some example embodiments.

A system, a machine-readable storage medium storing instructions, and a computer-implemented method are described herein to determine a player skill level of a player based at least on the player's performance in a game level and to select a hardness quotient based at least on the player skill level to be used by a definition file of a subsequent game level. In the following description, for purposes of explanation, numerous specific details are set forth in order to provide a thorough understanding of example embodiments. It will be evident, however, to one skilled in the art that the present technology may be practiced without these specific details.

According to various embodiments, A System Tuner selects a hardness quotient, based on a player skill level, from a hardness quotient range, the player skill level (PSL) for a player is calculated by a client computing device based at least on a plurality of game moves in a first game level completed by the player. The System Tuner provides the hardness quotient to a level definition file for a second game level. The level definition file modifies at least one feature of the second game level according to the hardness quotient. The System Tuner modifies the hardness quotient range based at least on a performance of the plurality of player's in the second game level and the respective hardness quotients assigned to each of those players for their game play in the second game level.

The System Tuner includes client computing device logic for monitoring the performance of a player and calculating a PSL for each player. The PSL for the player indicates a skill level of the player with respect to a target measurement of game performance. For example, if the player completes a level in the game with less attempts than a target number of attempts, the client computing device logic increases the player's PSL in order to represent an increase in the player's level of skill with respect to a target measurement of game performance. If the player completes the level in the game with more attempts than the target number of attempts, the client computing device logic decreases the player's PSL order to represent a decrease in the player's level of skill with respect to a target measurement of game performance. If the player completes the level in the game with the target number of attempts, the client computing device logic reinforces that the current PSL is correct.

In various embodiments, the PSL can account for any kind of game-related data compared to a corresponding target measurement, such as a number of game moves, an amount of game points, amount of time player, etc. It is understood that the System Tuner continually modifies and updates the target measurement of game performance based on the performance of one or more players of the game. In various embodiments, the System Tuner modifies and updates a plurality of different target measurements of game performance.

Each level of a game has a level definition file. The level definition file indicates one or more features and attributes (or game level settings) of a game level that can be modified in order to customize a player's experience according to whether, as non-limiting examples, the player is a highly-skilled player or a low-skilled player. A first level definition file can be used by a level definition file module executing on a client computing device to modify a first set of features and attributes for a first level and a second level definition file can be used by the level definition file module to modify a second set of features and attributes for a second level. It is understood that, in some embodiments, the first set and the second set indicate different features and attributes that are to be modified. In other words, where a hardness quotient provided to the level definition file module is used to modify, via a first level definition file, a range of speed at which a player can progress through the first level, the level definition file module uses the second level definition file and a hardness quotient to instead modify the vertical grace experienced at the second level. In other embodiments, the first set and the second set indicate similar features and attributes that are to be modified. In some embodiments, a level definition file can indicate multiple features and/or attributes of a game level to be modified. Each of these features and/or attributes to be modified may require a distinct, different hardness quotient. That is, the System Tuner will send multiple, different hardness quotients to the level definition file module to be processed with respect to the level definition file. It is understood that such features and attributes can be indicated for modification by a level definition file are, but are not limited to, types of game obstacles or hazards, a rate of appearance of various types of game obstacles or hazards, types of game bonus opportunities, a rate of appearance of various types of game opportunities, a range of motion allowed for a player, a range of speed allowed for a player, a rate of appearance of one or more chances to earn bonuses, respective amounts of rewards and a range of times to accomplish a game goal.

In some embodiments, the PSL is received from a client computing device and the System Tuner utilizes a player's PSL to select from a hardness quotient range. A hardness quotient range includes a plurality of possible hardness quotient values that correlate with a target measure of performance in a corresponding game level. Based on a player's PSL, the System Tuner selects a hardness quotient from the hardness quotient range. A level definition file module on a client device will utilize the level definition file and the selected hardness quotient to modify the attributes and features of the game level so as to make game play more difficult or easier such that the player's performance is closely aligned with the target measure of performance.

For example, where a player's PSL indicates a placement on a statistical distribution of all PSLs, the System Tuner selects a hardness quotient similarly placed on a statistical distribution of possible hardness quotient value in a hardness quotient range. That is, if a player's PSL indicates the player is in the lower $40^{th}$ percentile of all players, the selected hardness quotient will be of a value that is in the lower $40^{th}$ percentile of possible values in the hardness quotient range. The System Tuner sends the selected hardness quotient to a level definition file that corresponds to a level(s) in a game. In some embodiments, a Gaussian Process is used to identify the hardness quotients for each PSL value.

Where a particular game level has a level definition file that can be used by the level definition file module executing on a client computing device to modify one or more different features or attributes of the particular game level, then each attribute and/or feature modified via the level definition file will require a respective hardness quotient. In some embodiments, each respective hardness quotient is selected by the System Tuner from one of a plurality of different hardness quotient ranges. For example, a first hardness quotient is selected from a first hardness quotient range and a second hardness quotient is selected from a second hardness quotient range. It is understood that the values selected for the first and second hardness quotients, while both influenced at least by the player's PSL, need not be the same. In addition, the first and second hardness quotient ranges can be different numerical ranges as well.

The System Tuner continuously calculates and updates the plurality of different hardness quotient ranges based on game-related data that describes the game performance of a plurality of players. The System Tuner monitors the performance of each player in each level of the game with respect to the various hardness quotients used to customize features of the levels for each player. Based on each player's performance in a level, the player's PSL and the selected hardness quotients that customized that player's experience, the System Tuner creates a model for the level by identifying, for each PSL, previously-used hardness quotients that resulted in player performance that matched a target performance (such as a target number of attempts at the level). As the System Tuner updates the model for the level for each PSL, each hardness quotient range can narrow and expand to represent a minimum and a maximum hardness quotient value that will result in a player's performance that substantially matches the target performance. Therefore, as more players having similar PSLs play a game level modified by a level definition file and respective selected hardness quotients, the System Tuner utilizes each player's game performance to identify which of the respective selected hardness quotients tended to create game performances that align with the game level's target measure of performance. The System Tuner updates the hardness quotient range such that those values that did not create game performances that align with the game level's target measure of performance are less prevalent.

It is understood that various embodiments include the generation of one or more modules that comprise source code that, when compiled by a computing device(s), creates object code that causes the computing device(s) to perform one or more operations described herein. In other embodiments, any of the modules comprise object code that causes the computing device(s) to perform various operations described herein.

Other embodiments include the generation of one or more modules that comprise source code that, when compiled by a client computing device(s), creates object code that causes the client computing device(s) to perform one or more operations described herein in communication with a server computing devices(s). In other embodiments, any of the modules comprise object code that causes the client computing device(s) to perform various operations described herein in communication with the server computing devices(s).

Other embodiments include the generation of one or more modules that comprise source code that, when compiled by a server computing device(s), creates object code that causes the server computing device(s) to perform one or more operations described herein in communication with one or more client computing devices. In other embodiments, any of the modules comprise object code that causes the server computing device(s) to perform various operations described herein in communication with the one or more client computing devices.

Social Network Systems and Game Networking Systems

FIG. 1 illustrates an example of a system for implementing various disclosed embodiments. In particular embodiments, system 100 comprises player 101, social networking system 120a, game networking system 120b (i.e. online gaming system), client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a (i.e. social network system) is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social network systems 120a, game networking systems 120b, client systems 130, and networks 160, this disclosure contemplates any suitable number of players 101, social network systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b (i.e. online gaming system), which includes a Notification Generator 150 that performs operations according to embodiments as described herein. The game networking system 120b can be accessed using any suitable connection with a suitable client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120*b* can assign a unique identifier to each player 101 of an online game hosted on game networking system 120*b*. Game networking system 120*b* can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120*a*, or game networking system 120*b*). As an example and not by way of limitation, client system 130 can download client components of an online game, which are executed locally, while a remote game server, such as game networking system 120*b*, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120*b*.

Storing Game-Related Data

A database may store any data relating to game play within a game networking system 120*b*. The database may include database tables for storing a player game state that may include information about the player's virtual gameboard, the player's character, or other game-related information. For example, player game state may include virtual objects owned or used by the player, placement positions for virtual structural objects in the player's virtual gameboard, and the like. Player game state may also include in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database may also include database tables for storing a player profile that may include user-provided player information that is gathered from the player, the player's client device, or an affiliate social network. The user-provided player information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

In some example embodiments, the player profile may also include derived player information that may be determined from other information stored in the database. The derived player information may include information that indicates the player's level of engagement with the virtual game, the player's friend preferences, the player's reputation, the player's pattern of game-play, and the like. For example, the game networking system 120*b* may determine the player's friend preferences based on player attributes that the player's first-degree friends have in common, and may store these player attributes as friend preferences in the player profile. Furthermore, the game networking system 120*b* may determine reputation-related information for the player based on user-generated content (UGC) from the player or the player's $N^{th}$ degree friends (e.g., in-game messages or social network messages), and may store this reputation-related information in the player profile. The derived player information may also include information that indicates the player's character temperament during game play, anthropological measures for the player (e.g., tendency to like violent games), and the like.

In some example embodiments, the player's level of engagement may be indicated from the player's performance within the virtual game. For example, the player's level of engagement may be determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement may include a likelihood value indicating a likelihood that the player may perform a desired action. For example, the player's level of engagement may indicate a likelihood that the player may choose a particular environment, or may complete a new challenge within a determinable period of time from when it is first presented to him.

In some example embodiments, the player's level of engagement may include a likelihood that the player may be a leading player of the virtual game (a likelihood to lead). The game networking system 120*b* may determine the player's likelihood to lead value based on information from other players that interact with this player. For example, the game networking system 120*b* may determine the player's likelihood to lead value by measuring the other players' satisfaction in the virtual game, measuring their satisfaction from their interaction with the player, measuring the gameplay frequency for the other players in relation to their interaction frequency with the player (e.g., the ability for the player to retain others), and/or the like.

The game networking system 120*b* may also determine the player's likelihood to lead value based on information about the player's interactions with others and the outcome of these interactions. For example, the game networking system 120*b* may determine the player's likelihood to lead value by measuring the player's amount of interaction with other players (e.g., as measured by a number of challenges that the player cooperates with others, and/or an elapsed time duration related thereto), the player's amount of communication with other players, the tone of the communication sent or received by the player, and/or the like. Moreover, the game networking system 120*b* may determine the player's likelihood to lead value based on determining a likelihood for the other players to perform a certain action in response to interacting or communicating with the player and/or the player's virtual environment.

Game Systems, Social Networks, and Social Graphs:

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120*a* managed by a third-party (e.g., Facebook, Friendster, Myspace). In yet other embodiments, player 101 has a social network on both game networking system 120*b* and social networking system 120*a*, wherein player 101 can have a social network on the game networking system 120*b* that is a subset, superset, or independent of the player's social network on social networking system 120*a*. In such combined systems, game network system 120*b* can maintain social graph information with edge type attributes that indicate whether a given friend is an "in-game friend," an "out-of-game friend," or both. The various embodiments disclosed herein are operable when the social graph is managed by social networking system 120*a*, game networking system 120*b*, or both.

Figure 2:
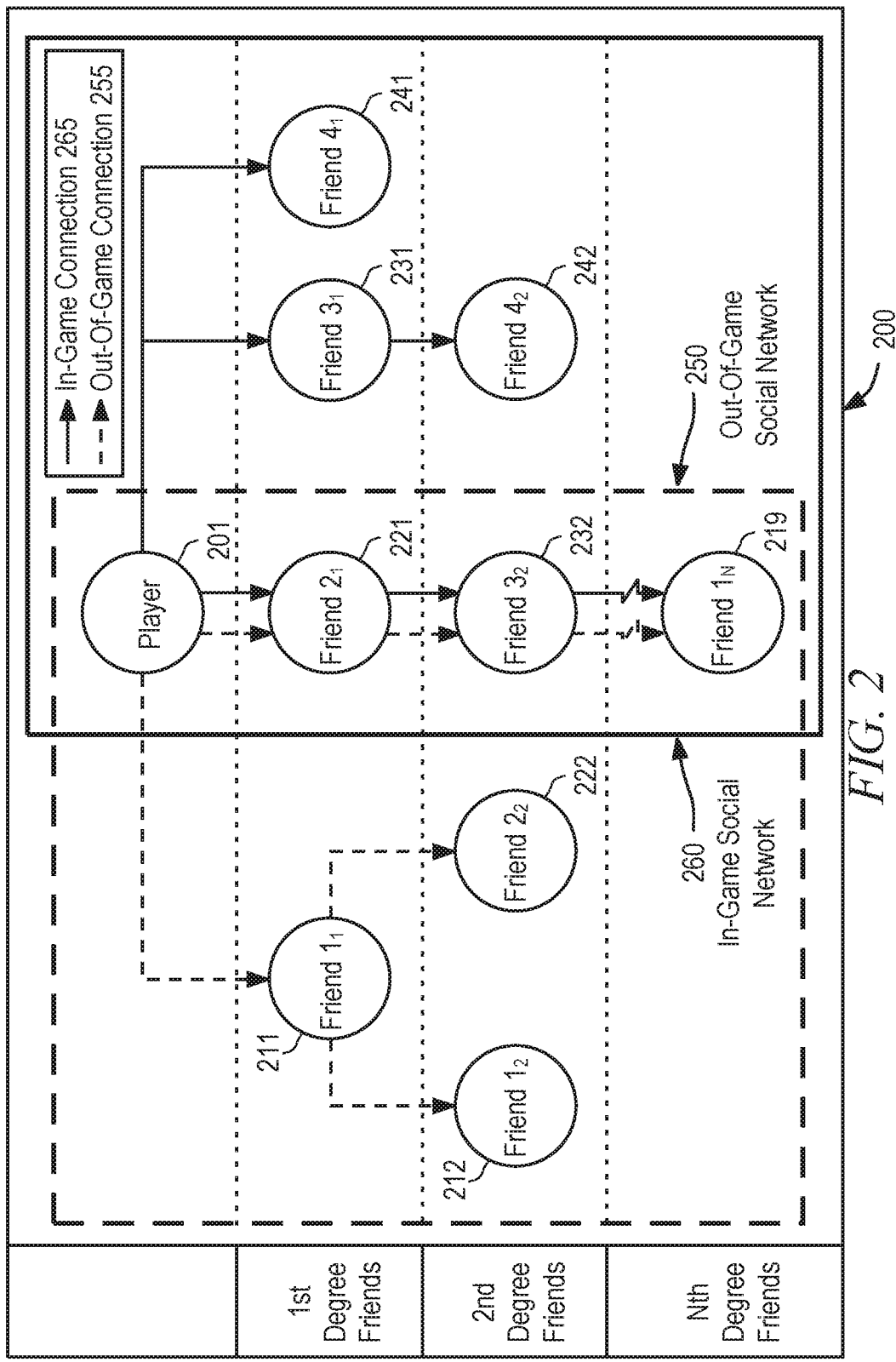
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player," "user" and "account" can be used interchangeably and can refer to any user or character in an online game networking system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120*a*.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Figure 3:
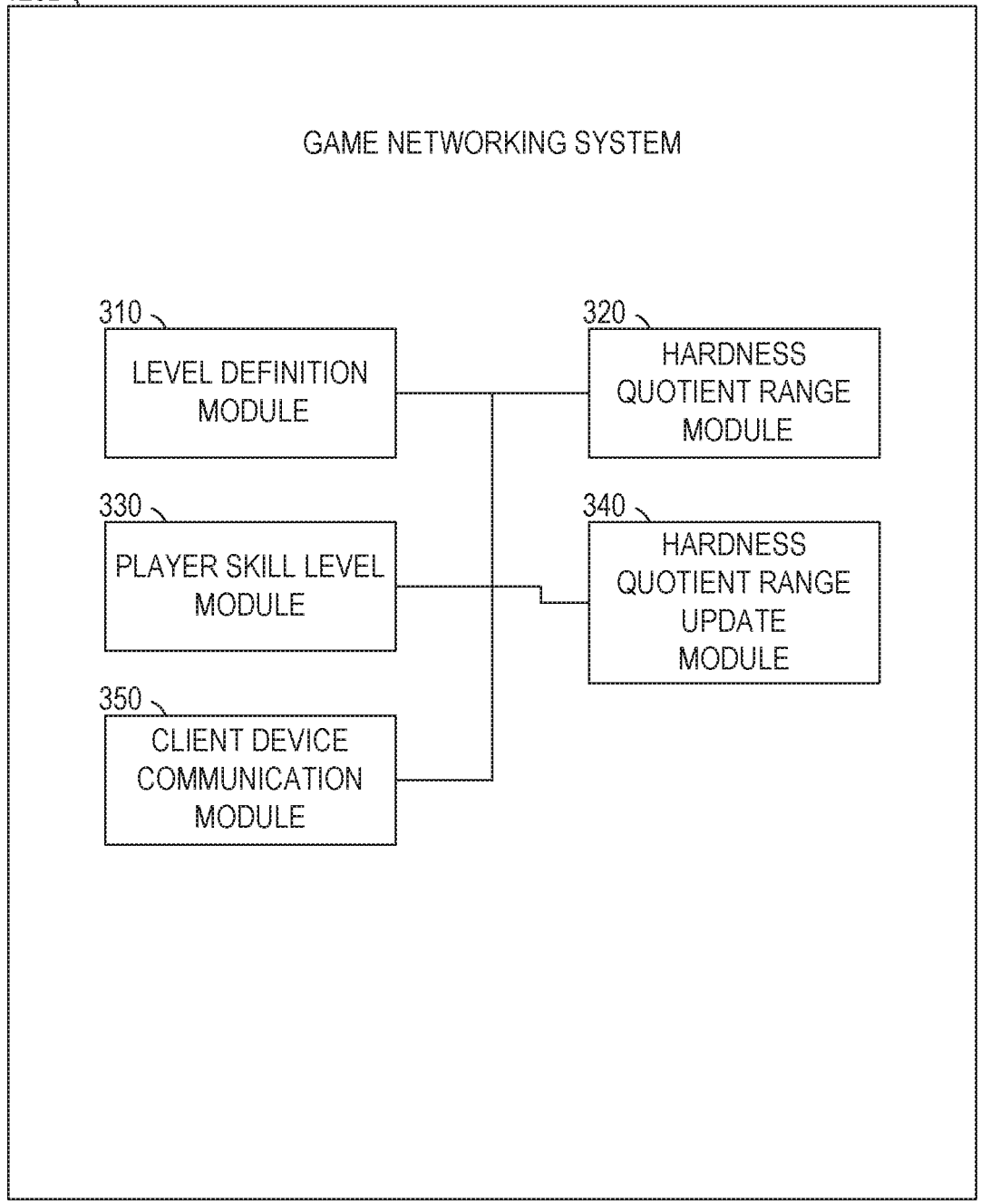
FIG. 3 is a block diagram illustrating components of a computing device, according to some example embodiments.

FIG. 3 is a block diagram illustrating components of a game networking system, according to some example embodiments. The game networking system 120*b* includes a level definition file 310, a hardness quotient range module 320, a player skill level module 330, a hardness quotient range update module 340 and client device communication module 350.

In various example embodiments, the level definition module 310, is a hardware-implemented module that controls, manages and stores information related to the generation of a level definition file module that, when executed on a client device, causes the client device to utilize a level definition file and one or more hardness quotients to modify one or more modifiable attributes or features of a game level(s). The level definition module 310 also controls, manages and stores information related to the generation of one or more level definition files that correspond to one or more modifiable attributes or features of a game level(s).

In various example embodiments, the hardness quotient range module 320 is a hardware-implemented module that controls, manages and stores information related to generating a hardness quotient range with respect to a target measure of performance in a game level. The hardness quotient range includes a one or more possible hardness quotient values.

In various example embodiments, the player skill level module 330, is a hardware-implemented module that controls, manages and stores information related to calculating and updating a respective player skill level for a plurality of players.

In various example embodiments, the hardness quotient range update module 340 may be a hardware-implemented module that controls, manages and stores information related to updating one or more hardness quotient ranges based on the game play performance of one or more players in a game level and previously-selected hardness quotients used to modify a game level via a level definition file.

In various example embodiments, the client device communication module 350 is a hardware-implemented module that controls, manages and stores information related to sending a level definition file module a level definition file(s) to a client computing device(s).

The modules 310-350 are configured to communicate with each other (e.g., via a bus, shared memory, or a switch). Any one or more of the modules 310-350 described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
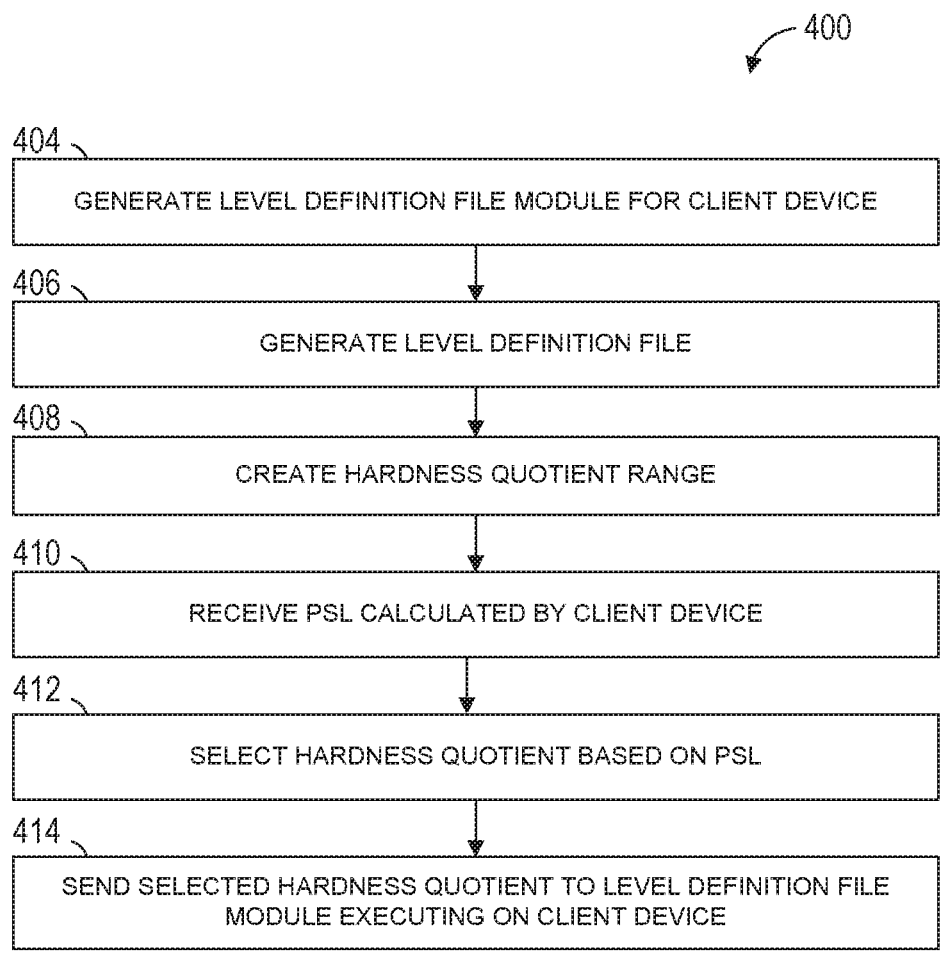
FIG. 4 is a flowchart showing an example method of sending a level definition file and a hardness quotient to a client computing device.

FIG. 4 is a flowchart 400 showing an example method of sending a level definition file and a hardness quotient to a client computing device.

At operation 404, the System Tuner generates a level definition file module to cause a client computing device to modify at least one attribute of a game level, via a level definition file, according to a hardness quotient received by the client computing device. In one embodiment, the System Tuner sends the level definition file module to the client computing device to be installed and subsequently executed on the client computing device. In another embodiment, the System Tuner sends the level definition file module to a data storage entity, such as an online application store, where it can be purchased and downloaded to the client computer device. In another embodiment, the System Tuner includes the level definition file module as part of a game, where the game is available at the data storage entity to be purchased and downloaded.

At operation 406, the System Tuner generates a level definition file that corresponds to at least one modifiable attribute of the game level. In one embodiment, the System Tuner sends the level definition file to the client computing device to be installed and subsequently utilized by the level definition file module executing on the client computing device. In another embodiment, the System Tuner includes the level definition file as part of the game that is to be stored at the data storage entity to be purchased and downloaded.

At operation 408, the System Tuner creates a hardness quotient range representative of one or more possible hardness quotients that correspond to a first target measure of performance in the game level. The hardness quotient range represents a statistical distribution of values that correspond to respective PSLs. A hardness quotient value for a player's given PSL correlates with modifying a game level to ensure that the player's game play in the game level aligns with the first target measure of performance in the game level.

At operation 410, the System Tuner receives a player skill level calculated by the client device for a first player. The PSL is based at least on a comparison between at least one game move of the first player in a previous game level and a second target measure of performance in the previous game level. The PSL indicates a skill level of the first player based on the first player's past performance in various levels of the game and/or various levels of a plurality of games.

At operation 412, the System Tuner selects a hardness quotient from the hardness quotient range. The selected hardness quotient is based at least on the player skill level of the first player.

At operation 414, the System Tuner sends the selected hardness quotient to the level definition file module of the client computing device. The level definition file module modifies the at least one specific, modifiable attribute of the game level via the level definition file according to the selected hardness quotient.

Data Flow

Figure 5:
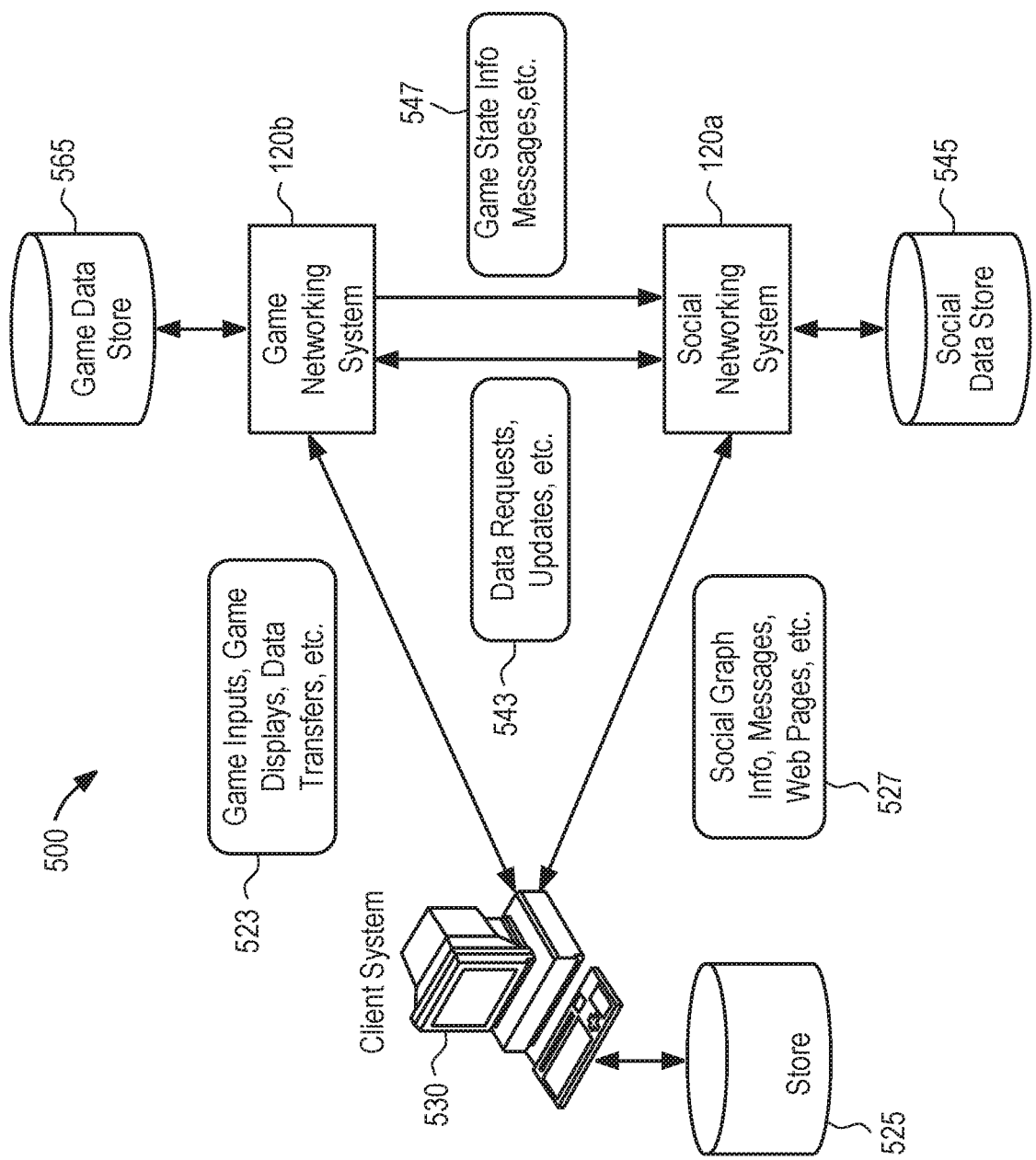
FIG. 5 is a diagrammatic representation of an example data flow between example components of the example system of FIG. 1, according to some example embodiments.

FIG. 5 illustrates an example data flow between the components of system 500. In particular embodiments, system 500 can include client system 530, social networking system 120a (i.e. social network system), and game networking system 120b (i.e. online game system system). The components of system 500 can be connected to each other in any suitable configuration, using any suitable type of connection. The components may be connected directly or over any suitable network. Client system 530, social networking system 120a, and game networking system 120bb can each have one or more corresponding data stores such as local data store 535, social data store 545, and game data store 565, respectively. Social networking system 120a and game networking system 120b can also have one or more servers that can communicate with client system 530 over an appropriate network. Social networking system 120a and game networking system 120b can have, for example, one or more internet servers for communicating with client system 530 via the Internet. Similarly, social networking system 120a and game networking system 120b can have one or more mobile servers for communicating with client system 530 via a mobile network (e.g., GSM, PCS, Wi-Fi, WPAN, etc.). In some embodiments, one server may be able to communicate with client system 530 over both the Internet and a mobile network. In other embodiments, separate servers can be used.

Client system 530 can receive and transmit data 523 to and from game networking system 120b. This data can include, for example, webpages, messages, game inputs, game displays, HTTP packets, data requests, transaction information, updates, and other suitable data. At some other time, or at the same time, game networking system 120b can communicate data 543, 547 (e.g., game state information, game system account information, page info, messages, data requests, updates, etc.) with other networking systems, such as social networking system 120a (e.g., Facebook, Myspace, etc.). Client system 530 can also receive and transmit data 527 to and from social networking system 120a. This data can include, for example, webpages, messages, social graph information, social network displays, HTTP packets, data requests, transaction information, updates, and other suitable data.

Communication between client system 530, social networking system 120a, and game networking system 120b can occur over any appropriate electronic communication medium or network using any suitable communications protocols. For example, client system 530, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTPS, FTP, SNMP, TELNET, and a number of other protocols, may be used. In some embodiments, no protocol may be used and, instead, transfer of raw data may be utilized via TCP or User Datagram Protocol. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 120b, the BLOB containing the game state for the instance corresponding to the player can be transmitted to client system 530 for use by a client-side executed object to process. In particular embodiments, the client-side executable may be a FLASH-based game, which can de-serialize the game state data in the BLOB. As a player plays the game, the game logic implemented at client system 530 maintains and modifies the various game state parameters locally. The client-side game logic may also batch game events, such as mouse clicks, and transmit these events to game networking system 120b. Game networking system 120b may itself operate by retrieving a copy of the BLOB from a database or an intermediate memory cache (memcache) layer. Game networking system 120b can also de-serialize the BLOB to resolve the game state parameters and execute its own game logic based on the events in the batch file of events transmitted by the client to synchronize the game state on the server side. Game networking system 120b may then re-serialize the game state, now modified, into a BLOB and pass this to a memory cache layer for lazy updates to a persistent database.

With a client-server environment in which the online games may run, one server system, such as game networking system 120b, may support multiple client systems 530. At any given time, there may be multiple players at multiple client systems 530 all playing the same online game. In practice, the number of players playing the same game at the same time may be very large. As the game progresses with each player, multiple players may provide different inputs to the online game at their respective client systems 530, and multiple client systems 530 may transmit multiple player inputs and/or game events to game networking system 120b for further processing. In addition, multiple client systems 530 may transmit other types of application data to game networking system 120b.

In particular embodiments, a computed-implemented game may be a text-based or turn-based game implemented as a series of web pages that are generated after a player selects one or more actions to perform. The web pages may be displayed in a browser client executed on client system 530. As an example and not by way of limitation, a client application downloaded to client system 530 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 120a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 530, either caused by an action of a game player or by the game logic itself, client system 530 may need to inform game networking system 120b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 500 is discussed in reference to updating a multi-player online game hosted on a network-addressable system (such as, for example, social networking system 120a or game networking system 120b), where an instance of the online game is executed remotely on a client system 530, which then transmits application event data to the hosting system such that the remote game server synchronizes game state associated with the instance executed by the client system 530.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 530 may include a Flash client. The Flash client may be configured to receive and run Flash application or game object code from any suitable networking system (such as, for example, social networking system 120a or game networking system 120b). In particular embodiments, the Flash client may be run in a browser client executed on client system 530. A player can interact with Flash objects using client system 530 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 530, the Flash client may send the events that caused the game state changes to the in-game object to game networking system 120*b*. However, to expedite the processing and hence the speed of the overall gaming experience, the Flash client may collect a batch of some number of events or updates into a batch file. The number of events or updates may be determined by the Flash client dynamically or determined by game networking system 120*b* based on server loads or other factors. For example, client system 530 may send a batch file to game networking system 120*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 530. In particular embodiments, the batch file may be a text file and the name-value pairs may be in string format.

In particular embodiments, when a player plays an online game on client system 530, game networking system 120*b* may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 120*b* may retrieve the corresponding BLOB from the database to determine the most-recent values of the game-related data. In particular embodiments, while a player is playing the online game, game networking system 120*b* may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 6:
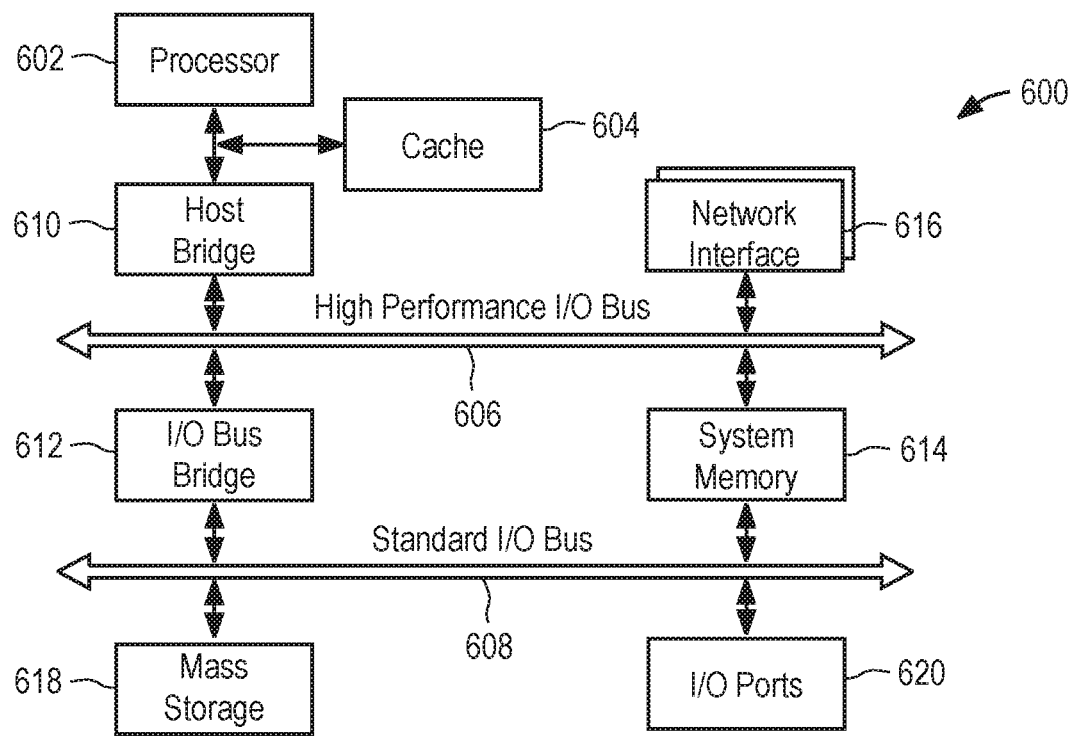
FIG. 6 illustrates an example computing system architecture, which may be used to implement a server or a client system illustrated in FIG. 6, according to some example embodiments.
Figure 7:
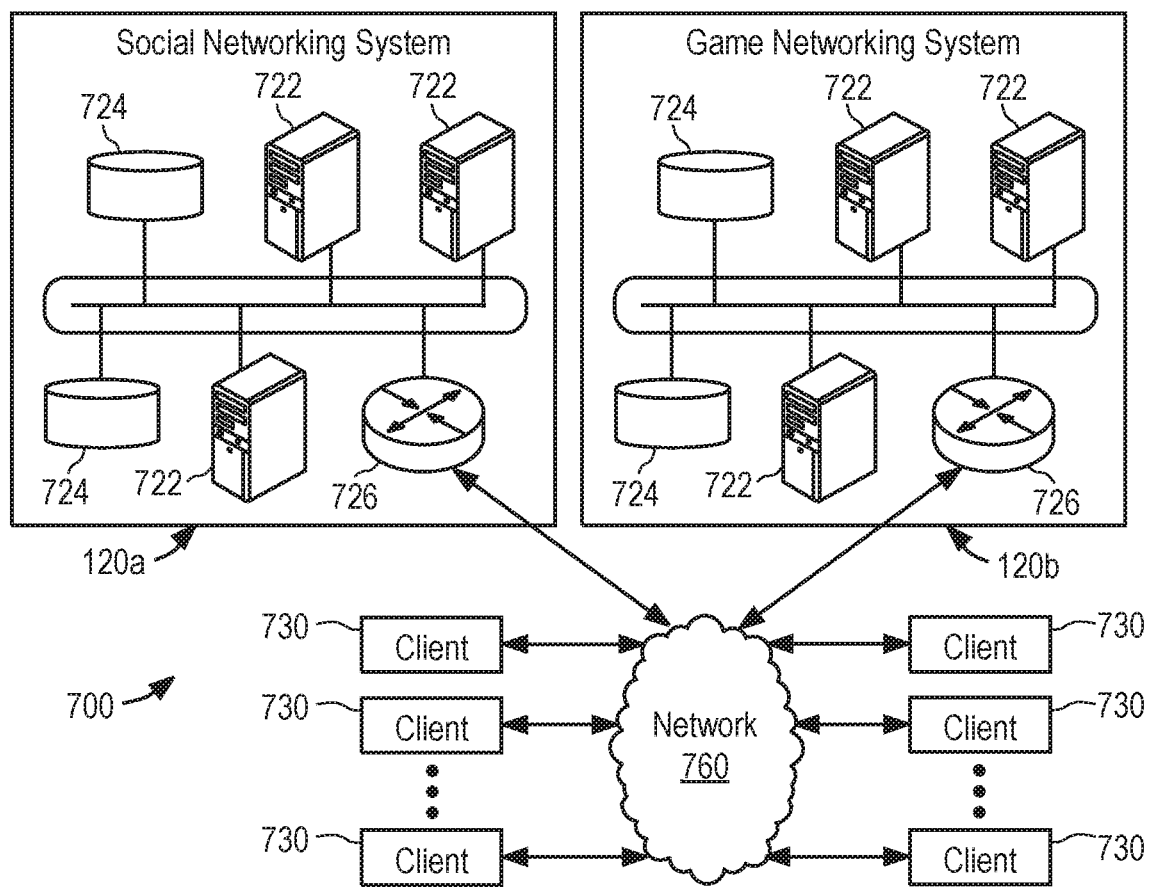
FIG. 7 illustrates an example network environment, in which various example embodiments may operate.

FIG. 6 illustrates an example computing system architecture, which may be used to implement a server 722 or a client system 730 illustrated in FIG. 7. In one embodiment, hardware system 600 comprises a processor 602, a cache memory 604, and one or more executable modules and drivers, stored on a tangible computer readable medium, directed to the functions described herein. Additionally, hardware system 600 may include a high performance input/output (I/O) bus 606 and a standard I/O bus 608. A host bridge 610 may couple processor 602 to high performance I/O bus 606, whereas I/O bus bridge 612 couples the two buses 606 and 608 to each other. A system memory 614 and one or more network/communication interfaces 616 may couple to bus 606. Hardware system 600 may further include video memory (not shown) and a display device coupled to the video memory. Mass storage 618 and I/O ports 620 may couple to bus 608. Hardware system 600 may optionally include a keyboard, a pointing device, and a display device (not shown) coupled to bus 608. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 600 are described in greater detail below. In particular, network interface 616 provides communication between hardware system 600 and any of a wide range of networks, such as an Ethernet (e.g., IEEE 802.3) network, a backplane, etc. Mass storage 618 provides permanent storage for the data and programming instructions to perform the above-described functions implemented in servers 1022, whereas system memory 614 (e.g., DRAM) provides temporary storage for the data and programming instructions when executed by processor 602. I/O ports 620 are one or more serial and/or parallel communication ports that provide communication between additional peripheral devices, which may be coupled to hardware system 600.

Hardware system 600 may include a variety of system architectures and various components of hardware system 600 may be rearranged. For example, cache 604 may be on-chip with processor 602. Alternatively, cache 604 and processor 602 may be packed together as a "processor module," with processor 602 being referred to as the "processor core." Furthermore, certain embodiments of the present disclosure may not require nor include all of the above components. For example, the peripheral devices shown coupled to standard I/O bus 608 may couple to high performance I/O bus 606. In addition, in some embodiments, only a single bus may exist, with the components of hardware system 600 being coupled to the single bus. Furthermore, hardware system 600 may include additional components, such as additional processors, storage devices, or memories.

An operating system manages and controls the operation of hardware system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft (r) Windows(r) operating systems, BSD operating systems, and the like. Of course, other embodiments are possible. For example, the functions described herein may be implemented in firmware or on an application-specific integrated circuit. Particular embodiments may operate in a wide area network environment, such as the Internet, including multiple network addressable systems.

FIG. 7 illustrates an example network environment, in which various example embodiments may operate. Network cloud 760 generally represents one or more interconnected networks, over which the systems and hosts described herein can communicate. Network cloud 760 may include packet-based wide area networks (such as the Internet), private networks, wireless networks, satellite networks, cellular networks, paging networks, and the like. As FIG. 7 illustrates, particular embodiments may operate in a network environment comprising one or more networking systems, such as social networking system 120*a*, game networking system 120*b*, and one or more client systems 730. The components of social networking system 120*a* and game networking system 120*b* operate analogously; as such, hereinafter they may be referred to simply at networking system 720. Client systems 730 are operably connected to the network environment via a network service provider, a wireless carrier, or any other suitable means.

Networking system 120 is a network addressable system that, in various example embodiments, comprises one or more physical servers 722 and data stores 724. The one or more physical servers 722 are operably connected to computer network 760 via, by way of example, a set of routers and/or networking switches 726. In an example embodiment, the functionality hosted by the one or more physical servers 722 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 722 may host functionality directed to the operations of networking system 720. Hereinafter servers 722 may be referred to as server 722, although server 722 may include numerous servers hosting, for example, networking system 720, as well as other content distribution servers, data stores, and databases. Data store 724 may store content and data relating to, and enabling, operation of networking system 720 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 724 corresponds to one or more of a variety of separate and integrated databases, such as relational databases and object-oriented databases, that maintain information as an integrated collection of logically related records or files stored on one or more physical systems. Structurally, data store 724 may generally include one or more of a large class of data storage and management systems. In particular embodiments, data store 724 may be implemented by any suitable physical system(s) including components, such as one or more database servers, mass storage media, media library systems, storage area networks, data storage clouds, and the like. In one example embodiment, data store 724 includes one or more servers, databases (e.g., MySQL), and/or data warehouses. Data store 724 may include data associated with different networking system 720 users and/or client systems 730.

Client system 730 is generally a computer or computing device including functionality for communicating (e.g., remotely) over a computer network. Client system 730 may be a desktop computer, laptop computer, personal digital assistant (PDA), in- or out-of-car navigation system, smart phone or other cellular or mobile phone, or mobile gaming device, among other suitable computing devices. Client system 730 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 730 to enter addresses of specific network resources to be retrieved, such as resources hosted by networking system 720. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 730 desires to view a particular webpage (hereinafter also referred to as target structured document) hosted by networking system 720, the user's web browser, or other document Sequence Generator or suitable client application, formulates and transmits a request to networking system 720. The request generally includes a URL or other document identifier as well as metadata or other information. By way of example, the request may include information identifying the user, such as a user ID, as well as information identifying or characterizing the web browser or operating system running on the user's client computing device 730. The request may also include location information identifying a geographic location of the user's client system or a logical network location of the user's client system. The request may also include a timestamp identifying when the request was transmitted.

Although the example network environment described above and illustrated in FIG. 7 described with respect to social networking system 120*a* and game networking system 120*b*, this disclosure encompasses any suitable network environment using any suitable systems. As an example and not by way of limitation, the network environment may include online media systems, online reviewing systems, online search engines, online advertising systems, or any combination of two or more such systems.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method, comprising:
    for each game level in a computer-implemented game having multiple game levels, providing a respective level definition file that comprises definition of a respective set of modifiable attributes according to which gameplay is governed in the corresponding game level, a first set of modifiable attributes that applies to a first one of the multiple game levels being different from a second set of modifiable attributes that applies to a second one of the multiple game levels;
    identifying a skill level for a player of the game based at least in part on historical gameplay by the player within the game;
    based at least in part on the identified skill level, performing player-specific modification of respective values of the first and second sets of modifiable attributes, such that the modified value of at least one of the first set of modifiable attributes is different from the modified value of at least one of the second set of modifiable attributes; and
    facilitating gameplay in the first game level and in the second game level according to the respective modified values of the first set of modifiable attributes and the second set of modifiable attributes, respectively.

2. The method of claim 1, wherein the first set of modifiable attributes and the second set of modifiable attributes each has a single respective attribute, the single attribute of the first set of modifiable attributes governing a different aspect of gameplay behavior than the single attribute of the second set of modifiable attributes.

3. The method of claim 1, wherein at least one of the first set of modifiable attributes and the second set of modifiable attributes defines a plurality of different attributes that are modifiable to vary player-specific game difficulty in the corresponding game level.

4. The method of claim 1, wherein performing the player-specific modification comprises:
    for each of a plurality of attributes included in the first set of modifiable attributes and/or in the second set of modifiable attributes, selecting a respective hardness quotient based at least in part on the identified skill level; and
    modifying the first set of modifiable attributes and the second set of modifiable attributes based at least in part on the corresponding selected hardness quotients.

5. The method of claim 4, wherein the first set of modifiable attributes and the second set of modifiable attributes share an attribute in common, the selecting of the plurality of hardness quotients being performed such that the hardness quotients for the common attribute differs in value for the first game level and for the second game level respectively.

6. The method of claim 4, further comprising:
   accessing a plurality of hardness quotient ranges corresponding respectively to a corresponding one of the plurality of attributes; and
   for each of the plurality of attributes, selecting the respective hardness quotient from the corresponding hardness quotient range based at least in part on the identified skill level.

7. The method of claim 4, wherein the plurality of attributes include a modifiable maximum speed for a player character in the corresponding game level.

8. A system comprising:
   one or more computer processor devices; and
   memory storing instructions that, when executed by the one or more computer processor devices, configure the system to perform operations comprising:
      for each game level in a computer-implemented game having multiple game levels, providing a respective level definition file that comprises definition of a respective set of modifiable attributes according to which gameplay is governed in the corresponding game level, a first set of modifiable attributes that applies to a first one of the multiple game levels being different from a second set of modifiable attributes that applies to a second one of the multiple game levels;
      identifying a skill level for a player of the game based at least in part on historical gameplay by the player within the game;
      based at least in part on the identified skill level, performing player-specific modification of respective values of the first and second sets of modifiable attributes, such that the modified value of at least one of the first set of modifiable attributes is different from the modified value of at least one of the second set of modifiable attributes; and
      facilitating gameplay in the first game level and in the second game level according to the respective modified values of the first set of modifiable attributes and the second set of modifiable attributes, respectively.

9. The system of claim 8, wherein the first set of modifiable attributes and the second set of modifiable attributes each has a single respective attribute, the single attribute of the first set of modifiable attributes governing a different aspect of gameplay behavior than the single attribute of the second set of modifiable attributes.

10. The system of claim 8, wherein at least one of the first set of modifiable attributes and the second set of modifiable attributes defines a plurality of different attributes that are modifiable to vary player-specific game difficulty in the corresponding game level.

11. The system of claim 8, wherein the instructions configure the one or more computer processor devices such that performing the player-specific modification comprises:
   for each of a plurality of attributes included in the first set of modifiable attributes and/or in the second set of modifiable attributes, selecting a respective hardness quotient based at least in part on the identified skill level; and
   modify the first set of modifiable attributes and the second set of modifiable attributes based at least in part on the corresponding selected hardness quotients.

12. The system of claim 11, wherein the first set of modifiable attributes and the second set of modifiable attributes share an attribute in common, the selecting of the plurality of hardness quotients being performed such that the hardness quotients for the common attribute differs in value for the first game level and for the second game level respectively.

13. The system of claim 11, wherein the instructions further configure the system to:
   access a plurality of hardness quotient ranges corresponding respectively to a corresponding one of the plurality of attributes; and
   for each of the plurality of attributes, select the respective hardness quotient from the corresponding hardness quotient range based at least in part on the identified skill level.

14. The system of claim 11, wherein the plurality of attributes include a modifiable amount of time to accomplish a task in the corresponding game level.

15. A non-transitory computer-readable storage medium having stored thereon instructions that, when executed by one or more computer processor devices, cause the one or more computer processor devices to perform operations comprising:
   for each game level in a computer-implemented game having multiple game levels, providing a respective level definition file that comprises definition of a respective set of modifiable attributes according to which gameplay is governed in the corresponding game level, a first set of modifiable attributes that applies to a first one of the multiple game levels being different from a second set of modifiable attributes that applies to a second one of the multiple game levels;
   identifying a skill level for a player of the game based at least in part on historical gameplay by the player within the game;
   based at least in part on the identified skill level, performing player-specific modification of respective values of the first and second sets of modifiable attributes, such that the modified value of at least one of the first set of modifiable attributes is different from the modified value of at least one of the second set of modifiable attributes; and
   facilitating gameplay in the first game level and in the second game level according to the respective modified values of the first set of modifiable attributes and the second set of modifiable attributes, respectively.

16. The computer-readable storage medium of claim 15, wherein the first set of modifiable attributes and the second set of modifiable attributes each has a single respective attribute, the single attribute of the first set of modifiable attributes governing a different aspect of gameplay behavior than the single attribute of the second set of modifiable attributes.

17. The computer-readable storage medium of claim 15, wherein at least one of the first set of modifiable attributes and the second set of modifiable attributes defines a plurality of different attributes that are modifiable to vary player-specific game difficulty in the corresponding game level.

18. The computer-readable storage medium of claim 15, wherein performing the player-specific modification comprises:
   for each of a plurality of attributes included in the first set of modifiable attributes and/or in the second set of modifiable attributes, selecting a respective hardness quotient based at least in part on the identified skill level; and modify the first set of modifiable attributes and the second set of modifiable attributes based at least in part on the corresponding selected hardness quotients.

19. The computer-readable storage medium of claim 18, wherein the first set of modifiable attributes and the second set of modifiable attributes share an attribute in common, the selecting of the plurality of hardness quotients being performed such that the hardness quotients for the common attribute differs in value for the first game level and for the second game level respectively.

20. The computer-readable storage medium of claim 18, wherein the instructions further configure the computer to:
- access a plurality of hardness quotient ranges corresponding respectively to a corresponding one of the plurality of attributes; and
- for each of the plurality of attributes, selecting the respective hardness quotient from the corresponding hardness quotient range based at least in part on the identified skill level.

* * * * *